United States Patent

Schneider et al.

[11] Patent Number: 5,982,487
[45] Date of Patent: Nov. 9, 1999

[54] INERTIAL SENSOR ARRANGEMENT WITH A HEAT INSULATED RIGID SENSOR BLOCK

[75] Inventors: Alfred Schneider, Überlingen; Karl Bauerbach, Owingen; Horst Renker; Werner Neumann, both of Überlingen, all of Germany

[73] Assignee: Bondenseewerk Geratetechnik GmbH, Überlingen, Germany

[21] Appl. No.: 09/060,335

[22] Filed: Apr. 15, 1998

[30] Foreign Application Priority Data

Apr. 17, 1997 [DE] Germany ............................ 197 16 026

[51] Int. Cl.[6] .................................................. G01C 19/72
[52] U.S. Cl. .............................. 356/350; 33/324
[58] Field of Search .............................. 356/350; 33/318, 33/319, 329

[56] References Cited

U.S. PATENT DOCUMENTS 5,778,543  7/1998  Schneider et al. ...................... 33/324

*Primary Examiner*—Samuel A. Turner
*Attorney, Agent, or Firm*—McDermott, Will & Emery

[57] ABSTRACT

An inertial sensor arrangement comprises a fiber gyro which responds to the horizontal component of the angular rate of the earth. A fiber coil of the fiber gyro is arranged at a positioning frame which is supported for rotation about a vertical axis relative to a housing. The positioning frame can be rotatably adjusted and mechanically locked into three fixed positions. Signals obtained thereby provide a measured value of the angle formed between a reference direction and north. Inclination sensors are provided for determining the inclination of the inertial sensor arrangement. The fiber coil inclusive of the positioning frame and two inclination sensors are mounted at a rigid sensor block which is connected to the housing in heat insulating manner.

8 Claims, 3 Drawing Sheets

5,982,487

INERTIAL SENSOR ARRANGEMENT WITH A HEAT INSULATED RIGID SENSOR BLOCK

BACKGROUND OF THE INVENTION

The present invention relates to a new and improved construction of an inertial sensor arrangement.

The present invention specifically relates to a new and improved inertial sensor arrangement of the type as described in prior U.S. patent application, Ser. No. 08/797, 162, filed Feb. 10, 1997, and which comprises an inertial sensor operating by utilizing the SAGNAC-effect. Such inertial sensor responds to the horizontal component of the angular rate of the earth and can be rotated about a vertical axis into a multiple number of fixed positions. Signals obtained thereby are processed through signal processing means in order to form a measured value representing the angle formed between a reference direction and north. The inertial sensor of the inertial sensor arrangement comprises a fiber gyro mounted at a positioning frame which is supported for rotation about a vertical axis relative to a housing. Adjusting means are provided for rotating the positioning frame into three fixed positions and locking means are provided for locking the same in the three fixed positions. Inclination sensors, which define intercrossing sensitive axes, are provided for determining the inclination of the inertial sensor arrangement relative to the horizontal.

In the construction described in the aforenoted prior U.S. patent application the signal processing means are formed by printed circuit boards which are provided with electronic components and which constitute the bottom and side walls of a rectangular inner housing. A positioning frame protrudes through the bottom into the inner housing and is rotatably supported therein by means of a bearing arrangement. A fiber gyro including a fiber coil is supported at the positioning frame. The positioning frame can be rotated about a vertical axis relative to the inner housing by means of a servo motor into three fixed positions which are defined by mechanical locking means. The input axis of the fiber gyro is inclined by an elevational angle relative to a plane which extends perpendicular to the vertical axis. An outer housing is open at its bottom and placed on top of the inner housing. Two accelerometers, which define respective, mutually substantially perpendicular sensitive axes, are fixedly mounted at respective printed circuit boards which form the side walls of the inner housing.

In the arrangement according to the aforenoted prior U.S. patent application, the accelerometers are mounted at the inner housing formed by the printed circuit boards. The fiber gyro is placed at the rotatably supported positioning frame. Due to thermal effects caused by the heat originating from the electronic components mounted at the printed circuit boards, slight distortions may occur at the printed circuit boards. Such distortions affect the relative positions of the accelerometers versus the fiber gyro. As a consequence, the measurement is adversely affected because the orientation of the fiber gyro relative to the horizontal is determined by the accelerometers.

SUMMARY OF THE INVENTION

Therefore, with the foregoing in mind, it is a primary object of the invention to provide a new and improved construction of an inertial sensor arrangement which is not afflicted with the drawbacks and limitations of the prior construction.

Another and more specific object of the invention is directed to a new and improved construction of an inertial sensor arrangement in which the inclination sensors are ensured to be fixed in their orientation relative to the fiber gyro.

It is an important object of the invention to provide a new and improved inertial sensor construction wherein the inclination sensing accelerometers are protected from heat effects which affect their orientation relative to the fiber gyro.

Now, in order to implement these and still further objects of the invention, which will become more readily apparent as the description proceeds, the inertial sensor arrangement according to the present development is manifested by the feature that, among other things, the fiber coil of the fiber gyro inclusive of the positioning frame as well as the two inclination sensors are placed at a rigid sensor block which is connected to the inner housing in heat insulated manner.

In this manner the two inclination sensors, i.e. the two accelerometers and the fiber gyro are mounted at one and the same member, namely the rigid sensor block, and thus have defined or predetermined mutual orientations relative to each other. The rigid sensor block is insulated from the heat generated at the inner housing so that thermal effects originating from the inner housing and the heat generating components mounted therat, can not adversely affect the operation of the inertial sensor arrangement.

BRIEF DESCRIPTION OF THE DRAWINGS

The invention will be better understood and objects other than those set forth above, will become apparent when consideration is given to the following detailed description thereof. Such description makes reference to the annexed drawings wherein the same or analogous components are designated by the same reference characters and wherein.

DETAILED DESCRIPTION OF THE PREFERRED EMBODIMENTS

Describing now the drawings, it will be understood that only enough of the construction of the inertial sensor arrangement has been shown as needed for those skilled in the art to readily understand the underlying principles and concepts of the present development, while simplifying the showing of the drawings. While an inertial sensor arrangement is described herein in conjunction with a specific construction, it should be noted that this construction is described merely as a matter of example in order to fully explain the favorable effects which can be achieved when utilizing the invention. It will be appreciated that the invention is not limited to the structure and components which are particularly mentioned in connection with the following example.

Figure 1:
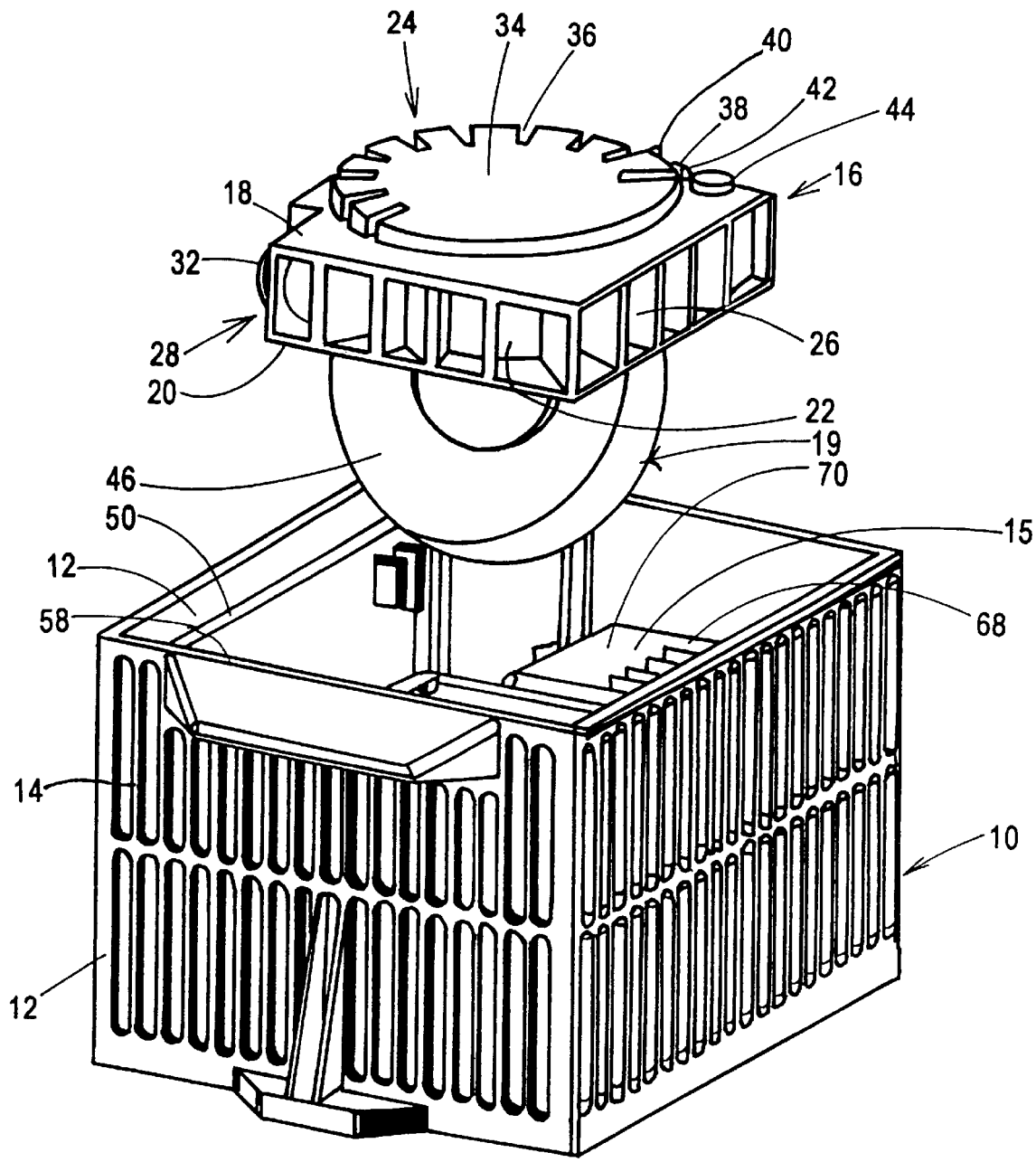
FIG. 1 is an extended perspective illustration showing the mechanical structure of an exemplary embodiment of the inventive inertial sensor arrangement containing a fiber gyro and two accelerometers placed at a rigid sensor block.

With reference to FIG. 1, there is shown therein a rectangular housing 10. The housing 10 comprises a box-shaped bottom member 12 which is open at the top as viewed in FIG. 1 and closed by a cover which is of conventional construction and, therefore, not shown in FIG. 1. On its outer side, the housing 10 is provided with cooling fins 14. A sensor block 16 is shown above the housing 10 in the extended illustration of FIG. 1, however, is inserted into the housing 10 in the mounted condition of the inventive inertial sensor arrangement. The sensor block 16 is rigidly held within the housing 10 by conventional holding means only schematically indicated at 78 in FIG. 3. Also, the inserted sensor block 16 is heat insulated from the housing 10 using insulating means of conventional construction which are, therefore, not particularly shown.

The sensor block 16 comprises two mutually substantially parallel plates 18 and 20 which are interconnected by means of a bearing 22, which rotatably supports a positioning frame 24, and radial ribs 26 which extend in radial direction as defined by the plates 18,20. In this manner, there is obtained a plate-shaped support body 28 having a light-weight but rigid structure.

Figure 3:
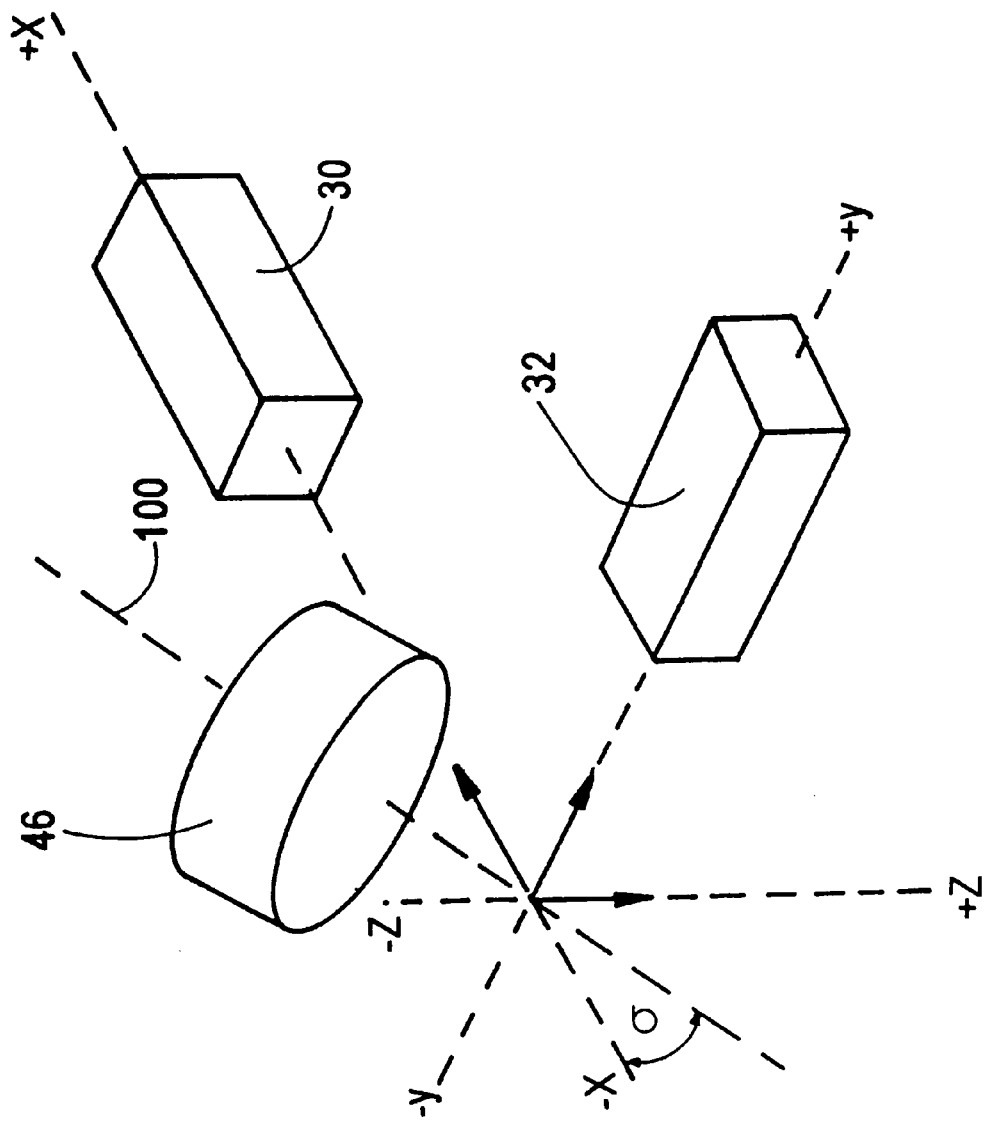
FIG. 3 is a schematic illustration showing the fiber gyro and the accelerometers in their mutual orientation in the inertial sensor arrangement as shown in FIG. 1.

Two accelerometers 30 and 32 of which only the accelerometer 32 is visible in the drawing of FIG. 1, are placed at the support body 28 which in its entirety constitutes a plate-shaped rigid support body. As viewed in FIG. 1, the accelerometers 30 and 32 are respectively placed at the left-hand rear corner and the left-hand front corner of the support body 28. In this view, the sensitive axis of the accelerometer 30 extends substantially parallel to a first edge of the support body 28 from the left on the rear to the left at the front in correspondence with the x-direction as shown in FIG. 3. Furthermore, in this view, the sensitive axis of the accelerometer 32 extends substantially perpendicular to the sensitive axis of the accelerometer 30 and substantially parallel to a second edge of the support body 28 from the left at the front to the right at the front in correspondence with the y-direction as shown in FIG. 3.

The positioning frame 24 is rotatably supported by means of the bearing 22 at the support body 28. The positioning frame 24 comprises a positioning disc 34 which extends substantially parallel to and at a spacing from the top plate 18 of the support body 28 as viewed in FIG. 1. A series of radial slots 36 is provided at the circumference of the positioning disc 34 and extend in a radial direction as defined by the positioning disc 34. A drive disc 38 is placed upon the plate 18 and rotatably supported at the support body 28. The drive disc 38 extends below the circumference of the positioning disc 34, which circumference is provided with the slots 36, and carries two eccentric, axially extending members 40 and 42 which are located at an angular offset of 180° and which extend in an axial direction as defined by the drive disc 38. The axially extending members 40 and 42 may be constructed in the manner of pins or rolls or the like and, in the position shown in FIG. 1, the axially extending member 40 is in engagement with one of the slots 36.

The drive disc 38 is drivingly connected to a servo motor 44. When the drive disc 38 is driven by means of the servo motor 44, then, the axially extending member 40 or 42, as the case may be, which engages one of the slots 36, rotates the positioning disc 34 by one step. During this operation, the respective other axially extending member 42 or 40, as the case may be, will enter the next-following slot 36 at the circumference of the positioning disc 34. Upon a further rotation of the drive disc 38 by 180°, the positioning disc 34 will be further rotated by the engaged axially extending member 42 or 40, as the case may be, until the first mentioned axially extending member 40 or 42, as the case may be, enters the next-following slot 36. There is thus formed a Geneva-type drive by means of which the positioning disc 34 is indexed by a predetermined rotational step upon each revolution of the drive disc 38. In the illustrated specific embodiment of the inventive construc-tion, the positioning disc 34 is indexed by 90° upon two revolutions of the drive disc 38. In this manner, the positioning disc 34 is rotated from a 0°-position into a 90°-position by means of two revolutions of the drive disc 38 and from the 90°-position to a 180°-position again by means of two revolutions of the drive disc 38. The positioning disc 34 is arrested in each one of these rotary positions in well-defined manner due to the axially extending members 40 and 42.

Figure 2:
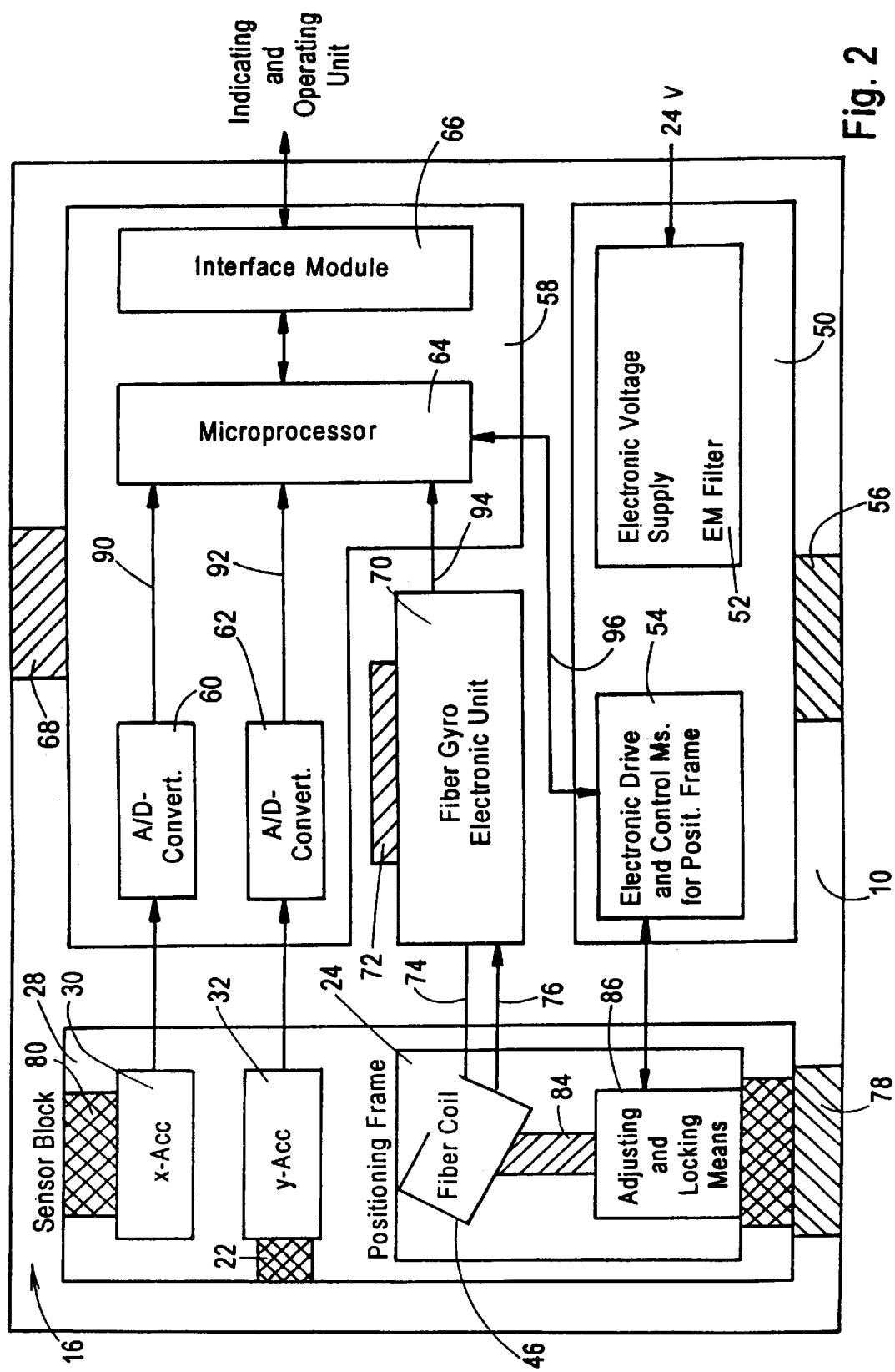
FIG. 2 is a block circuit diagram of the rigid sensor block and explains the signal processing operation in the inertial sensor arrangement as shown in FIG. 1.

As viewed in FIG. 1, the positioning disc 34 is connected to a fiber coil 46 of a fiber gyro 19 on the lower side of the support body 28 by means of a holding fixture which is of conventional construction and, therefore, only schematically indicated at 84 in FIG. 2. The positioning disc 34 conjointly with the holding fixture 84 of the fiber coil 46 constitutes the positioning frame 24 which is rotatably mounted by means of the bearing 22. The rigid sensor block 16, in turn, is constituted by both the positioning frame 24 inclusive of the fiber coil 46 and the support body 28 inclusive of the accelerometers 30 and 32. In such rigid sensor block 16, the accelerometers 30 and 32 and the fiber coil 46 are rigidly interconnected in each position of the fiber coil 46 in a manner such that the signals generated thereby precisely indicate the position of the fiber coil 46 relative to the perpendicular. The mutual position of these members relative to each other is not affected by thermal deformation or distortion originating in the housing 10. The rigid sensor block 16 is inserted into the lower or bottom housing member 12 with a "suspended" fiber coil 46 in heat insulated manner.

As illustrated in FIG. 3, the measuring axis 100 as defined by the fiber coil 46, is inclined by an elevation angle σ relative to a plane, namely the x-y plane in FIG. 3, which extends normally to the vertical as well as the rotational axis which is the z-axis in FIG. 3.

A printed circuit board 50 is placed substantially parallel to the left-hand side wall of the housing 10, as viewed in FIG. 1. The printed circuit board 50 is equipped with components required for current and voltage supply to the electronic components and the sensors. These components are illustrated by block 52 shown in FIG. 2. Further placed at the printed circuit board 50 is the electronic drive and control means operatively associated with the positioning frame 24. These components are illustrated by block 54 shown in FIG. 2. The printed circuit board 50 is connected to the housing 10 using mechanical holders 56 of conventional and, therefore, not shown construction.

A printed circuit board 58 is placed substantially parallel to a front wall of the housing 10, as viewed in FIG. 1. The printed circuit board 58 is equipped with the electronic components for signal processing and control operations. Included therein are two analog-digital converters 60 and 62, see FIG. 2, for digitizing the signals respectively generated by the accelerometers 30 and 32. Further included therein is a central signal processing unit in the form of a microprocessor 64, see FIG. 2. Also, an interface module 66, see FIG. 2, is placed on the printed circuit board 58 which is held at the housing 10 using mounting means of conventional and, therefore, not shown construction.

At the right-hand side wall of the housing 10, as viewed in FIG. 1, there is placed a unit 70 which is associated with the fiber gyro 46 and includes all of the electronic and optronic components therefore. The unit 70 is fixedly connected to the housing 10 using a conventional and, therefore, not shown attachment. Thus, the unit 70 can not be rotated conjointly with the positioning frame 24. The fiber coil 46 is connected to the unit 70 via flexible optical fibers 74 and 76, see FIG. 2.

In the block circuit diagram of FIG. 2, there is schematically illustrated that the rigid sensor block 16 is connected to the housing 10 by the aforementioned mechanically fixed but heat insulating holding means 78. As indicated by respective mounting means 80 and 82, the accelerometers 30 and 32 are mechanically fixedly connected to the support body 28 of the sensor block 16.

As also indicated in the block circuit diagram of FIG. 2, the positioning frame 24 includes the fiber coil 46 and its holding fixture 84 as well as the adjusting means which are illustrated by the block marked 86 and which comprise the Geneva-type drive (including the positioning disc 34 and the drive disc 38) and the servo motor 44.

The aforedescribed inertial sensor arrangement operates as follows:

The acceleration signals respectively generated by the accelerometers 30 and 32, are supplied to the microprocessor 64 through the respective analog-digital converters 60 and 62 as well as the respective data lines 90 and 92 as shown in FIG. 2. The microprocessor 64 further receives the signals generated by the fiber gyro 19 through a data line 94 also shown in FIG. 2. During this operation, the optronic components as well as the electronic components of the fiber gyro 19 are arranged in the housing 10 in stationary manner whereas only the fiber coil 46 is rotated into the different measuring positions. The fiber gyro 19 responds to the components of the angular rate Ω of the earth. Therefrom, the microprocessor 64 determines firstly, during a nothing operation, the deviation from north of a reference axis, for example, the y-axis. The thus obtained data is outputted to a not specifically illustrated operating unit through the interface module 66.

The electronic drive and control means 54 provides for the positioning frame 24 to be sequentially rotated into the 0°-position, the 90°-position and the 180°-position. The signals, which are respectively measured in each one of these positions by means of the fiber coil 46, are stored. The sine and cosine of the north angle (for quadrant determination) as well as the drift of the fiber gyro 19 can be computed from the three measured signals thus obtained from the fiber gyro by taking into account the known inclination angles which are supplied by the accelerometers 30, 32. This computation is effected by the microprocessor 64 which also acts upon the electronic drive and control means 54 as indicated in FIG. 2 by the bidirectional arrow 96.

The inclined position of the fiber gyro 19 also permits detecting the rotational speed about the vertical or z-axis, see FIG. 3. Therefrom, a heading angle can be continuously computed or, alternatively, a signal can be generated for maintaining the heading.

This has been described in detail in the initially mentioned prior U.S. patent application.

In FIG. 3 there are schematically indicated the mutual positions of the housing-fixed axes, namely the x-axis, the y-axis, and the z-axis or vertical axis as well as the measuring axis 100 of the fiber gyro 19, i.e. the axis defined by the fiber coil 46. The sensitive axes of the accelerometers 30 and 32 respectively extend in the direction of the x-axis and the y-axis.

While there are shown and described present preferred embodiments of the invention, it is to be distinctly understood that the invention is not limited thereto, but may be otherwise variously embodied and practiced within the scope of the following claims. Accordingly,

What we claim is:

1. An inertial sensor arrangement comprising:

an inertial sensor operating by utilizing the Sagnac-effect;

said inertial sensor responding to the horizontal component of the angular rate of the earth;

an arrangement of said inertial sensor defining a vertical axis, a reference direction extending at an angle relative to north and including:

a housing defining at least one wall;

a fiber gyro constituting said inertial sensor and encompassing a fiber coil;

a positioning frame supported for rotation about said vertical axis relative to said housing;

said fiber coil of said fiber gyro being placed at said positioning frame;

adjusting means for adjusting said positioning frame into a multiple number of fixed positions; and locking means for locking said positioning frame into said multiple number of fixed positions;

a multiple number of inclination sensors for determining an inclination of said arrangement relative to the horizontal;

said inclination sensors defining respective sensitive axes which cross each other;

a rigid sensor block connected to said housing in heat insulating manner;

said positioning frame inclusive of said fiber coil and said multiple number of inclination sensors being mounted at said rigid sensor block; and signal processing means receiving output signals, which are generated by said fiber coil and said multiple number of inclination sensors upon adjustment of said positioning frame into said multiple number of fixed positions, and producing from said output signals a measured value indicative of an angle formed between said reference direction and north.

2. The inertial sensor arrangement as defined in claim 1, wherein:

said adjusting means comprise rotary drive means for rotating said positioning frame into said multiple number of fixed positions which constitute three fixed rotary positions; and said multiple number of inclination sensors encompassing two inclination sensors defining respective sensitive axes.

3. The inertial sensor arrangement as defined in claim 1, further including mechanical holding means mechanically fixedly connecting said rigid sensor block to said housing.

4. The inertial sensor arrangement as defined in claim 3, further including:

a plate-shaped rigid support body defining a first side and a second side which is opposite to said first side;

said rigid sensor block including said plate-shaped rigid support body;

said plate-shaped rigid support body being rigidly fastened to said housing in heat insulating manner;

said multiple number of inclination sensors being arranged substantially perpendicular to each other at said plate-shaped rigid support body;

said positioning frame being rotatably supported at said plate-shaped rigid support body;

said positioning frame comprising a positioning disc arranged at said first side of said plate-shaped rigid support body;

said fiber coil of said fiber gyro being arranged at said second side of said plate-shaped rigid support body and connected to said positioning frame; and said adjusting means being placed at said plate-shaped rigid support body for cooperation with said positioning disc.

5. The inertial sensor arrangement as defined in claim 4, further including:

a servo motor;

said adjusting means comprising said servo motor;

transmission means constructed in the manner of Geneva drive; and said transmission means coupling said servo motor and said positioning disc.

6. The inertial sensor arrangement as defined in claim 5, wherein said transmission means comprises:

a sequence of radial slots provided at the circumference of said positioning disc and extending in a radial direction defined by said positioning disc;

a drive disc drivingly connected to said servo motor and defining an axial direction;

said drive disc being provided with a pair of eccentric members extending in said axial direction;

said eccentric members of said drive disc, during operation of said servo motor, alternatingly engaging respective ones of said radial slots at said circumference of said positioning disc for indexing said positioning disc by a predetermined rotational adjusting angle upon each revolution of said drive disc, in order to thereby adjust said positioning frame into said multiple number of fixed positions.

7. The inertial sensor arrangement as defined in claim 4, wherein:

said plate-shaped rigid support body comprises a pair of substantially parallel plates which define a radial direction;

bearing means rotationally supporting said positioning frame at said plate-shaped rigid support body;

said pair of substantially parallel plates being interconnected by means of (i) said bearing means and (ii) radial ribs extending in said radial direction; and said radial ribs being arranged to surround said bearing means.

8. The inertial sensor arrangement as defined in claim 1, further including:

a unit associated with said fiber gyro;

said unit comprising electronic and optronic components operatively associated with said fiber gyro;

said unit being mounted at said at least one wall of said housing;

flexible optical fibers; and said flexible optical fibers interconnectinng said unit and said fiber coil of said fiber gyro.

* * * * *